US008533859B2

(12) United States Patent
Keshavachar et al.

(10) Patent No.: US 8,533,859 B2
(45) Date of Patent: Sep. 10, 2013

(54) SYSTEM AND METHOD FOR SOFTWARE PROTECTION AND SECURE SOFTWARE DISTRIBUTION

(75) Inventors: Bhaktha Ram Keshavachar, Carlsbad, CA (US); Navin Govind, Carlsbad, CA (US)

(73) Assignee: Aventyn, Inc., Carlsbad, AZ (US)

( * ) Notice: Subject to any disclaimer, the term of this patent is extended or adjusted under 35 U.S.C. 154(b) by 537 days.

(21) Appl. No.: 12/422,569

(22) Filed: Apr. 13, 2009

(65) Prior Publication Data

US 2010/0262824 A1  Oct. 14, 2010

(51) Int. Cl.
*H04N 7/16* (2011.01)
*G06F 17/30* (2006.01)

(52) U.S. Cl.
USPC .................. 726/29; 726/32; 726/33; 705/51; 705/57

(58) Field of Classification Search
USPC .................................. 726/32, 33; 705/51, 57
See application file for complete search history.

(56) References Cited

U.S. PATENT DOCUMENTS

| | | | | |
|---|---|---|---|---|
| 7,587,724 | B2 * | 9/2009 | Yeap | 719/328 |
| 7,877,329 | B2 * | 1/2011 | Richards | 705/57 |
| 8,020,146 | B2 * | 9/2011 | Hudson, Jr. | 717/120 |
| 2003/0154467 | A1 * | 8/2003 | Charnell | 717/140 |
| 2004/0059897 | A1 * | 3/2004 | Rose et al. | 712/233 |
| 2005/0066311 | A1 * | 3/2005 | Hagmeier et al. | 717/128 |
| 2006/0013199 | A1 * | 1/2006 | Boora et al. | 370/352 |
| 2006/0156314 | A1 * | 7/2006 | Waldorf | 719/328 |
| 2007/0101139 | A1 * | 5/2007 | Bayer et al. | 713/168 |
| 2007/0198656 | A1 * | 8/2007 | Mazzaferri et al. | 709/218 |
| 2007/0299944 | A1 * | 12/2007 | Bodin et al. | 709/222 |
| 2008/0034199 | A1 * | 2/2008 | Nair et al. | 713/153 |
| 2008/0137842 | A1 * | 6/2008 | Everett et al. | 380/29 |
| 2008/0178298 | A1 * | 7/2008 | Arai et al. | 726/29 |
| 2009/0037492 | A1 * | 2/2009 | Baitalmal et al. | 707/201 |
| 2009/0204964 | A1 * | 8/2009 | Foley et al. | 718/1 |
| 2009/0254538 | A1 * | 10/2009 | Arthurs et al. | 707/5 |
| 2010/0106705 | A1 * | 4/2010 | Rush et al. | 707/709 |

OTHER PUBLICATIONS

"API Call Basics", Feb. 7, 2009, Salesforce.com, all pages, http://web.archive.org/web/20090207130549/http://salesforce.com/us/developer/docs/api/Content/calls.htm.*

* cited by examiner

*Primary Examiner* — Tuan C. To
*Assistant Examiner* — Calvin Cheung
(74) *Attorney, Agent, or Firm* — DLA Piper LLP (US)

(57) ABSTRACT

The various embodiments of the present invention provide a secure software distribution and execution method. According to the method, a server receives software from service provider for downloading to a client and identifies the sections for encoding. APIs are inserted in the identified sections. A unique ID is created based on the identity of the each client to generate an encryption algorithm, decryption key and decryption algorithm. The identified sections are encrypted with the generated encryption algorithm. The encrypted application along with encryption algorithm, decryption key and decryption algorithm are downloaded to the driver of the client machine. The API makes call to the driver by sending the encrypted segment when the encrypted portion is reached during the execution of software in the client machine so that the driver decrypts the encoded portion using the received key and the decryption algorithm to enable the continuous execution of the downloaded software.

13 Claims, 5 Drawing Sheets

SYSTEM AND METHOD FOR SOFTWARE PROTECTION AND SECURE SOFTWARE DISTRIBUTION

BACKGROUND

1. Technical Field

The embodiments herein generally relate to software distribution system and more particularly to secure software distribution system and method for each individual user machine.

2. Description of the Related Art

Computer software is a consumer product distributed using hardware storage devices or internet. The authenticity of the user can be verified with a unique identity provided with the software. However, an unscrupulous party with access to the object code may distribute the software illegally. Unlicensed users may avail the benefits of the software and maintain anonymity resulting in huge revenue losses to the software provider.

Software piracy is rampant leading to copyright infringement. The digital environment provides substantial anonymity to the infringers. Unlicensed and copyrighted work is distributed easily over the internet. The loss incurred by software and literary copyright holders is estimated to be several billions of dollars. The infringement and prosecution of infringer is substantially high. The loss of revenue to smaller entities due to infringement has devastating economical impact.

Software providers adopt various monitoring methods to detect and control piracy. In a conventional solution the number of installations using an authentic key is limited. However, this may inconvenience an authentic user from installing a licensed version of the software multiple times. The enforcement of copyright is expensive and requires extensive resources.

Hence there is a need to provide an improved and secured system and method for the distribution of software to each individual user and user machine to prevent piracy and accommodate a legitimate user.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concept of the invention in a simplified form as a prelude to the more detailed description that is presented later.

The various embodiments of the present invention provide a secure software distribution system and method to generate unique and individual algorithm for each user/application to provide a very strong security solution for protecting application and data integrity. The system provides a robust security platform for software vendors and users and generates platform specific algorithms to avoid the class break scenario that is prevalent on systems/implementations. The present invention creates unique platform ID and executes proprietary reconfigurable algorithm for authentication and fraud detection.

According to one embodiment of the present invention, a secure software distribution and execution method is provided. According to the method, a software application is received from a service provider and stored in a server for downloading to a client. The received and stored software application is coded in the server before being downloaded to the client. Then the modules of code are identified for encryption by the server. The Application Programming Interface (API) calls are inserted in the received software in predefined modules before being downloaded to the client from the server. Afterward the application is built and the binaries are placed in the server.

The coded application is downloaded to the client from the server based on the request. The identity data of the client is read by the server during the downloading of the coded application to the client. The identity data includes the serial number of the client's machine, serial number of the hard disc used in the client's machine, biometric information and other identification related information.

The algorithm for encryption, decryption key and decryption algorithm are generated based on the received identity data of the client in the server. The identified modules of the software are encrypted using the generated encryption algorithm in the server. The encrypted portions of the software along with the generated decryption key and the decryption algorithm are downloaded to the driver of the client machine. The API makes the call to driver by sending the encrypted segment when the encrypted portion is reached during the execution of the software in the client machine so that the driver decrypts the encoded portion using the received key and the decryption algorithm to enable the continuous execution of the downloaded software. The API makes calls to the driver for decryption during the execution when the software execution reaches to encrypted portion.

The encryption algorithm, key and decryption algorithm are unique and are different for different clients. The algorithm for encryption, decryption key and decryption algorithm are generated based on the received identity data of the client in the server. The identity data includes the serial number of the client machine, serial number of the hard disc used in the client machine, biometric information and other identification related information. The server assigns weighting factor to each of the identification data read from the machine so that the client machine is authenticated to decode the encrypted portion, even when the identification component is changed in the client. The server authenticates the client for decoding the encrypted portion of the file by comparing the sum of the weighting factors assigned to the identity data with a threshold level. The server authenticates the machine for decoding the encrypted portion of the file, when the sum of the weighting factors assigned to the identity data is less than the threshold level. The machine is not authenticated and the key generation algorithm is destroyed, when the sum of the weighting factors assigned to the identity data is less than the threshold level.

The key generation algorithm is designed uniquely for each client on the fly. The key generation algorithm and the decryption algorithm are run in privileged mode in cache memory. The decrypted code is destroyed after each use. The decryption algorithms used for decrypting the different encrypted files in the same application in the same client are different. The unique decryption algorithm is designed for each client on the fly, when the client initiates a software download of an application or registers software that is available on a media.

According to another embodiment of the present invention, a secure software distribution and execution system is provided to generate algorithm corresponding to each client/system/application to prevent class break scenario. According to the system, a server has an application interface which is connected to a service provider or a software developer to receive, store and encode software to be down loaded to the client which is connected to the server. The server identifies the modules of the software to be encrypted and inserts API calls in the identified modules.

The server has Identification Data (ID) reader to send commands to the client to read pluralities of identification data, when the client is connected to the server for downloading an application. The identification data includes the serial number of the client machine, serial number of the hard disc used in the client machine, biometric information and other identification related information. The received identification data are stored in a prioritized ID index table. The unique ID generator produces a unique ID based on the received and stored ID data.

A secure data locator in the server identifies the section of the application file to be encrypted based on the inserted API calls. The secure code execution unit in the server encrypts the identified sections of the application using an encryption algorithm which is generated based on the produced unique ID. A decryptor is provided in the server to generate a decryption algorithm for decrypting the encrypted portion in the application.

The server generates an encryption algorithm, decryption key and decryption algorithm based on the generated unique ID of the client. The server transmits the encoded software inserted with API calls to the client along with the encryption algorithm, decryption key and decryption algorithm to the driver of the client so that the API makes the call to the driver by sending the encrypted segment and the driver decrypts the encoded portion using the received key and the decryption algorithm to enable the continuous execution of the downloaded software, when the encrypted portion is reached during the execution of the software.

The API makes calls to the driver for decryption, whenever the encrypted portion is reached during the execution of the software. The driver of the client contacts the server for downloading the encryption algorithm, decryption key and decryption algorithm. The encryption algorithm, decryption key and the decryption algorithm are downloaded to the cache memory of the client through the application downloader provided to the client from the server, whenever the request for encrypted file is received at the server from the client. The ID of the client is read and compared with the unique ID sent from the server. When the read ID of the client is same as the received unique ID from the server, the downloaded decryption algorithm is used to decrypt the encrypted portion. The decryption algorithm and the received code are destroyed after each use. The process is followed whenever the API calls are made to the driver of the server.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

Although specific features of the present invention are shown in some drawings and not in others. This is done for convenience only as each feature may be combined with any or all of the other features in accordance with the present invention.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
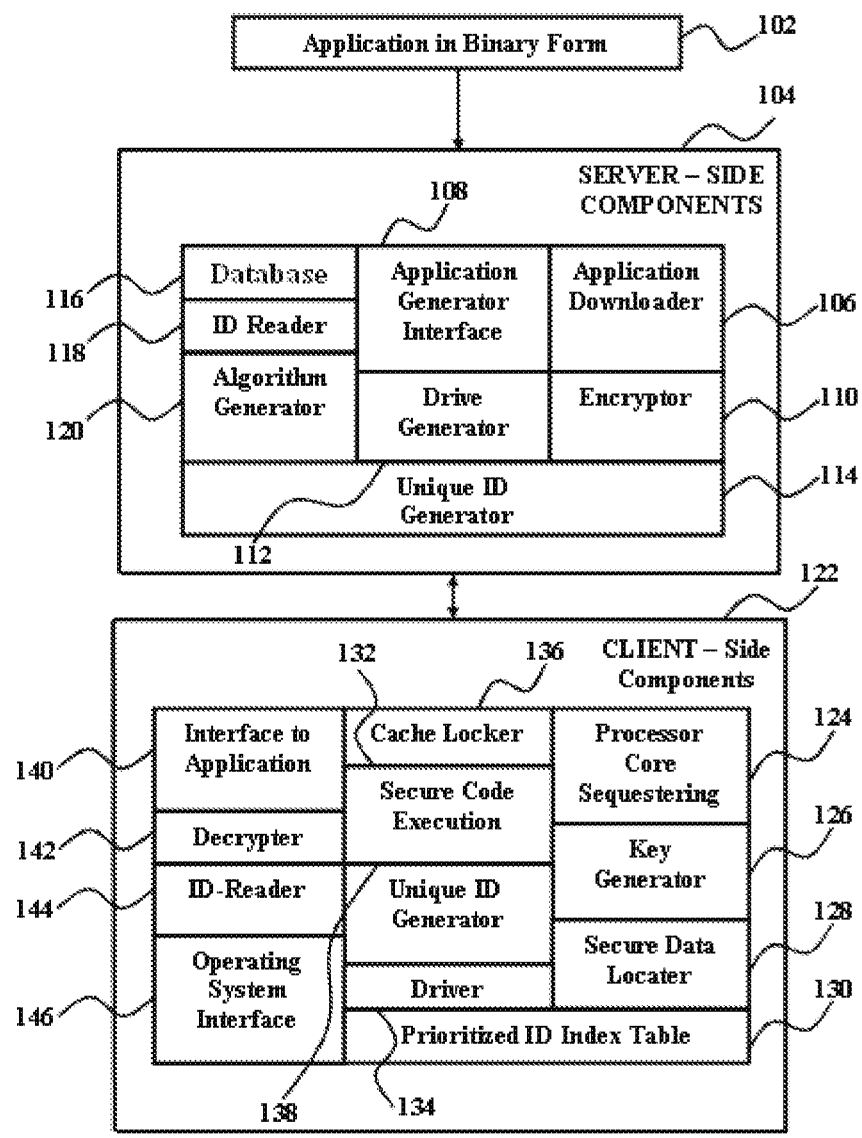
FIG. 1 illustrates a functional block diagram of a secure software distribution and execution system according to one embodiment of the present invention.

FIG. 1 illustrates a functional block diagram of a secure software distribution and execution system according to one embodiment of the present invention. With respect to FIG. 1, a secure computing server 104 has an application interface 108 which is connected to a service provider or a software developer to receive, store and encode software 102 to be down loaded to the client machine 122 which is connected to the server 104. The application 102 is downloaded to the server 104 through an application downloader 106. The server 104 identifies the sections of the software to be encrypted and inserts API calls in the identified sections. The server 104 has an encryptor 110 to encrypt the identified sections of the software 102. The list of encrypted sections of the software is created and stored in a data base 116.

The server 104 has identification data (ID) reader 118 to send commands to the client 122 to read pluralities of identification data, when the client 122 is connected to the server 104 for downloading an application 102. The identification data includes the serial number of the client machine 122, serial number of the hard disc used in the client machine 122, biometric information and other identification related information. The received identification data are stored in the database 116. The unique ID generator 114 produces a unique ID based on the received and stored ID data. The server 104 has an algorithm generator 120 to create an encryption algorithm for encrypting the identified sections of the software 102 based on the generated unique ID. The server 104 generates an encryption algorithm, decryption key and decryption algorithm based on the generated unique ID of the client 122. A drive generator 112 is provided in the server 104 to create a new driver after the encryption of the identified sections using the generated encryption algorithm. The server 104 transmits the encoded software inserted with API calls to the client along with the encryption algorithm, decryption key and decryption algorithm to the driver 134 of the client machine 122.

The API makes the call to the driver 134 of the client machine 122 by sending the encrypted segment and the driver 134 decrypts the encoded portion using the received key and the decryption algorithm to enable the continuous execution of the downloaded software 102, when the encrypted portion is reached during the execution of the software 102 in the client machine 122.

A secure data locator 128 in the client 122 identifies the section of the application file to be decrypted based on the inserted API calls during the execution of the application in the client machine 122. The secure code execution unit 132 in the client 122 executes the code in the application by decrypting the identified sections of the application using a decryption algorithm which is generated based on the produced unique ID. A decryptor 142 is provided in the client 122 to generate a decryption algorithm for decrypting the encrypted portion in the application 102.

The API makes calls to the driver 134 for decryption, whenever the encrypted portion is reached during the execution of the software 102. The driver 134 of the client machine 122 contacts the server 104 for downloading the encryption algorithm, decryption key and decryption algorithm. The encryption algorithm, decryption key and the decryption algorithm are downloaded to the cache memory of the user machine 122 through the application interface 140 provided in the client machine 122 from the server 104, whenever the request for encrypted file is received at the server 104 from the client machine. The ID of the client 122 is read using an ID reader 144. The read ID data are stored in a prioritized ID index table 130. A unique ID is generated by a unique ID generator 138 provided in the client 122 and compared with the unique ID sent from the server 104. When the read ID of the client 122 is same as the received unique ID from the server 104, the downloaded decryption algorithm is used to decrypt the encrypted portion. The decryption algorithm and the received code are destroyed after each use. The process is followed whenever the API calls are made to the driver 134 of the client 122.

The cache memory is locked to the server 104 using a cache locker 136 to download the encryption algorithm, decryption key and the decryption algorithm. The client 122 has a prioritized ID index table 130 to store the various identity data of the client 122 such as the serial number of the client machine 122, serial number of the hard disc used in the client machine 122, along with the respective weights assigned to each ID data, so that the client is identified, even when one of the identity is missing. A key generator 126 is provided in the client 122 to run a key generation algorithm to produce a key for decrypting the secure code. The decrypted code is executed using a secure code execution unit 132. The key generation algorithm and the decryption algorithm are destroyed after each use.

Figure 2A:
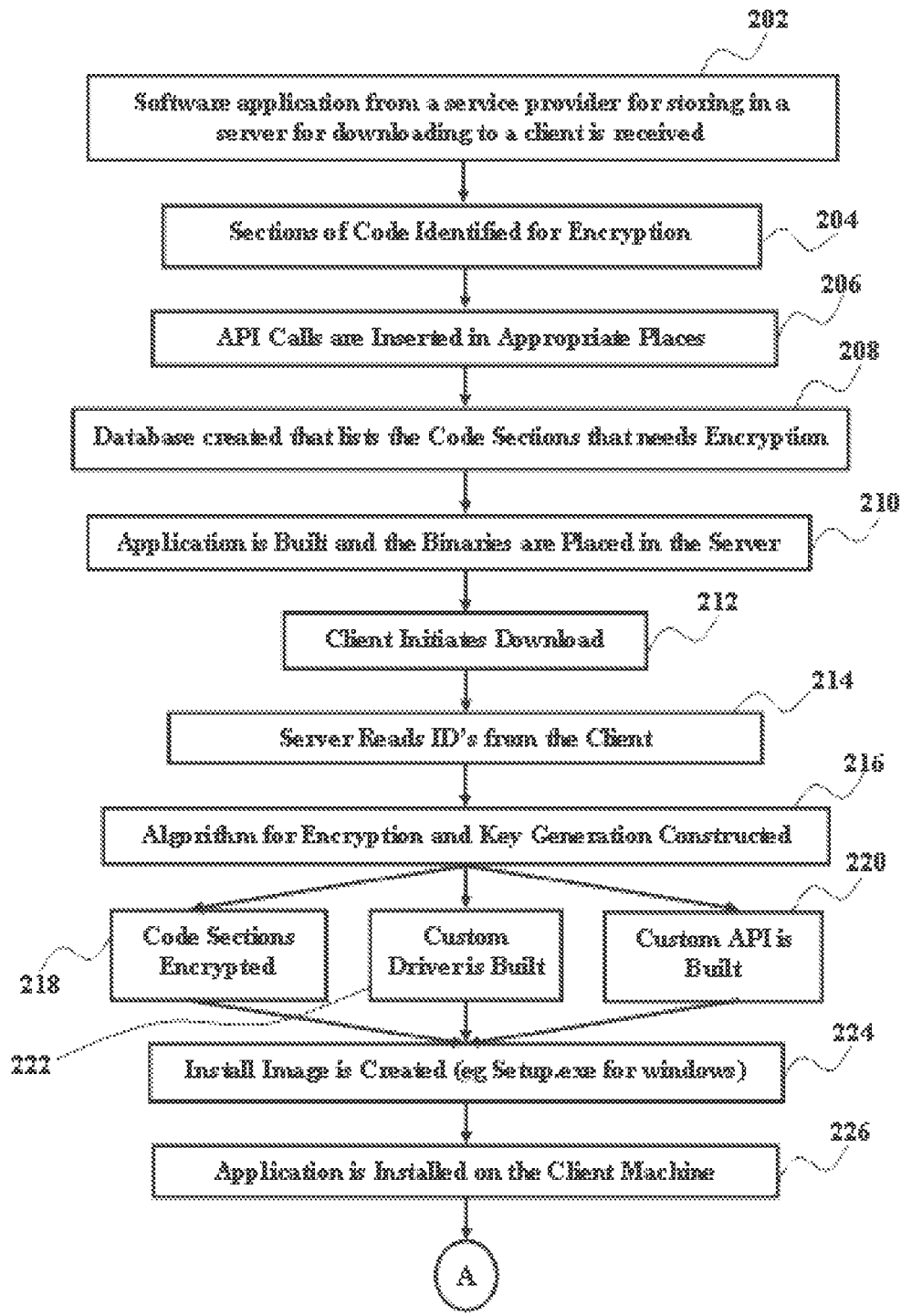
FIG. 2 illustrates a flow chart explaining a secure software distribution and execution method according to one embodiment of the present invention.
Figure 2B:
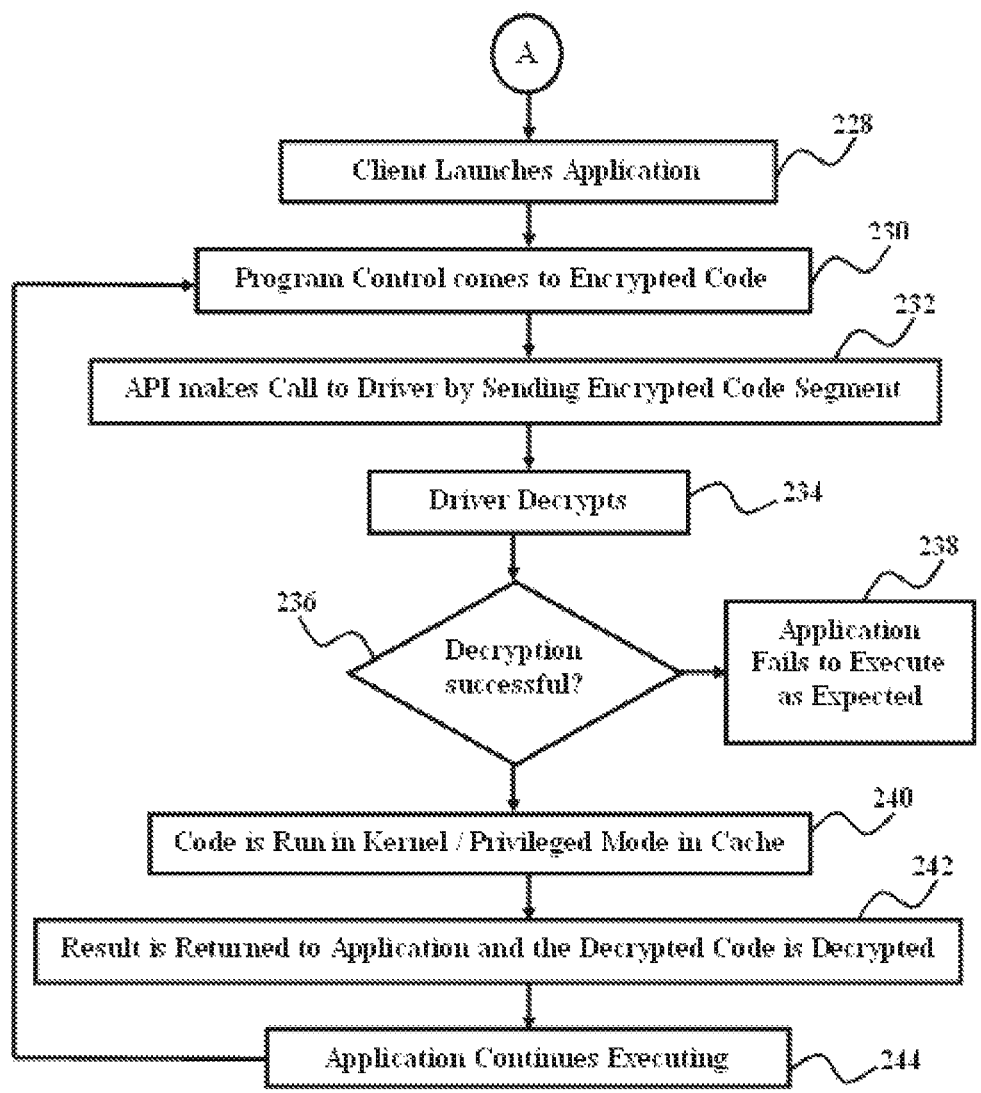

FIG. 2 illustrates a flow chart explaining a secure software distribution and execution method according to one embodiment of the present invention. With respect to FIG. 2, a software application is received from a service provider and stored in a server for downloading to a client (202). The received and stored software application is coded in the server before being downloaded to the client. Then the sections of code are identified for encryption by the server (204). The Application Programming Interface (API) calls are inserted in the received software at appropriate places corresponding to the identified modules/sections in the software before being downloaded to the client by the server (206). A list of code sections that needs encryption is created and stored in a database (208). Afterwards the application is built and the binaries are placed in the server (210).

The coded application is downloaded to the client machine from the server based on the request (212). The identity data of the client is read by the server during the downloading of the coded application to the user (214). The identity data includes the serial number of the client machine, serial number of the hard disc used in the client machine, biometric and identification related information.

The algorithm for encryption, decryption key and decryption algorithm are generated based on the received identity data of the client in the server (216). The identified sections of the software are encrypted using the generated encryption algorithm in the server (218). A custom API is built (220) and a custom driver is built (222) in the software to be downloaded to the client. An install image is created (224). The encrypted portions of the software along with the generated decryption key and the decryption algorithm are downloaded to the driver of the client machine (226). The downloaded application is run on the client (228). A program control identifies the encrypted code during the execution of the application in the client (230). The API makes the call to driver by sending the encrypted segment when the encrypted portion is reached during the execution of the software in the client machine (232). The driver decrypts the encoded portion using the received key and the decryption algorithm to enable the continuous execution of the downloaded software (234). When the encoded portion is decrypted successfully (236), the code is run in the kernel or run in a privileged mode in the cache (240). When the encoded portion is not decrypted successfully (236), the application is failed to execute as expected (238).

The API makes calls to the driver for decryption, whenever the encrypted portion is reached during the execution of the software. The encryption algorithm, key and decryption algorithm are unique and are different for different clients. The algorithm for encryption, decryption key and decryption algorithm are generated based on the received identity data of the client in the server. The server assigns weighting factor to each of the identification data read from the client so that the client is authenticated to decode the encrypted portion, even when the hard disc is changed in the client machine. The server authenticates the client for decoding the encrypted portion of the file by comparing the sum of the weighting factors assigned to the identity data with a threshold level. The server authenticates the client for decoding the encrypted portion of the file, when the sum of the weighting factors assigned to the identity data is less than the threshold level. The client is not authenticated and the key generation algorithm is destroyed, when the sum of the weighting factors assigned to the identity data is less than the threshold level.

The key generation algorithm is designed uniquely for each client. The key generation algorithm and the decryption algorithm are run in privileged mode in cache memory (240). Then the encrypted portion is decrypted (242) and the code is executed continuously (244). The decrypted code is destroyed after each use. The decryption algorithms used for decrypting the different encrypted files in the same application in the same machine are different. The unique decryption algorithm is designed for each client, when the client machine initiates a software download of an application or registers software that is available on a media.

Figure 3:
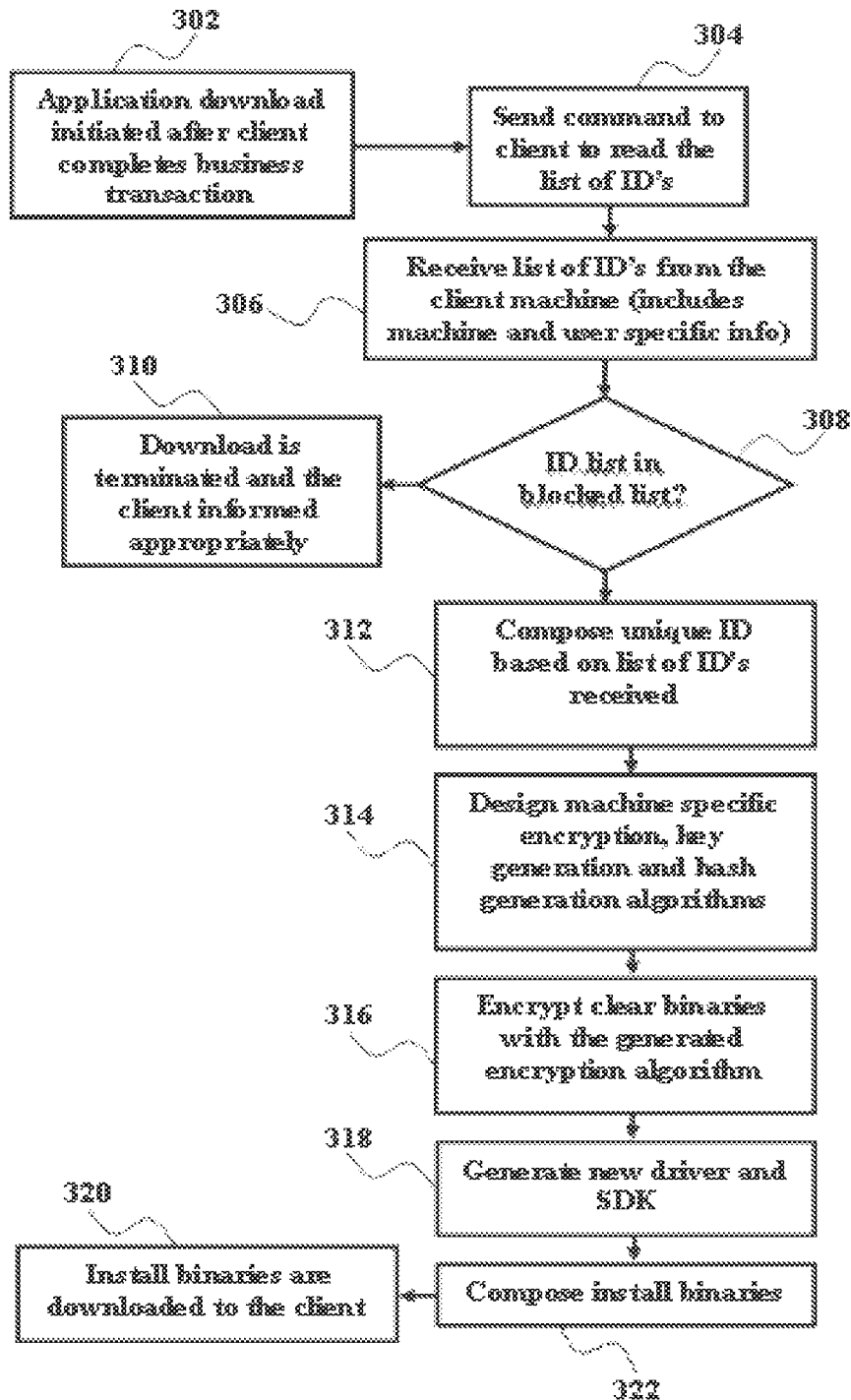
FIG. 3 illustrates a flow chart explaining the processes executed in the server in the secure software distribution and execution method according to one embodiment of the present invention.

FIG. 3 illustrates a flow chart explaining the processes executed in the server in the secure software distribution and execution method according to one embodiment of the present invention. With respect to FIG. 3, the server initiates the download of the client application, after the completion of the business transaction by the client (302). The server sends a command to the client to read the list of ID data (304). The server receives a list of ID data including the serial number of the client machine, the client specific data from the client machine (306). The received ID data is checked with the list of blocked ID data (308). When the list of the received ID is the same as the block listed ID data, then the download of the application to the client is terminated and the client is informed accordingly (310). When the list of the received ID is not the same as the block listed ID data, a unique ID is generated based on the list of ID received from the client (312). An encryption algorithm, a key generation algorithm and hash generation algorithms are generated corresponding to the client based on the generated new ID (314). The clear binaries of the application are encrypted with the generated encryption algorithm (316). A new driver and SDK are prepared (318). All the install binaries are composed (322). Then all the composed install binaries are downloaded to the client (324).

Figure 4:
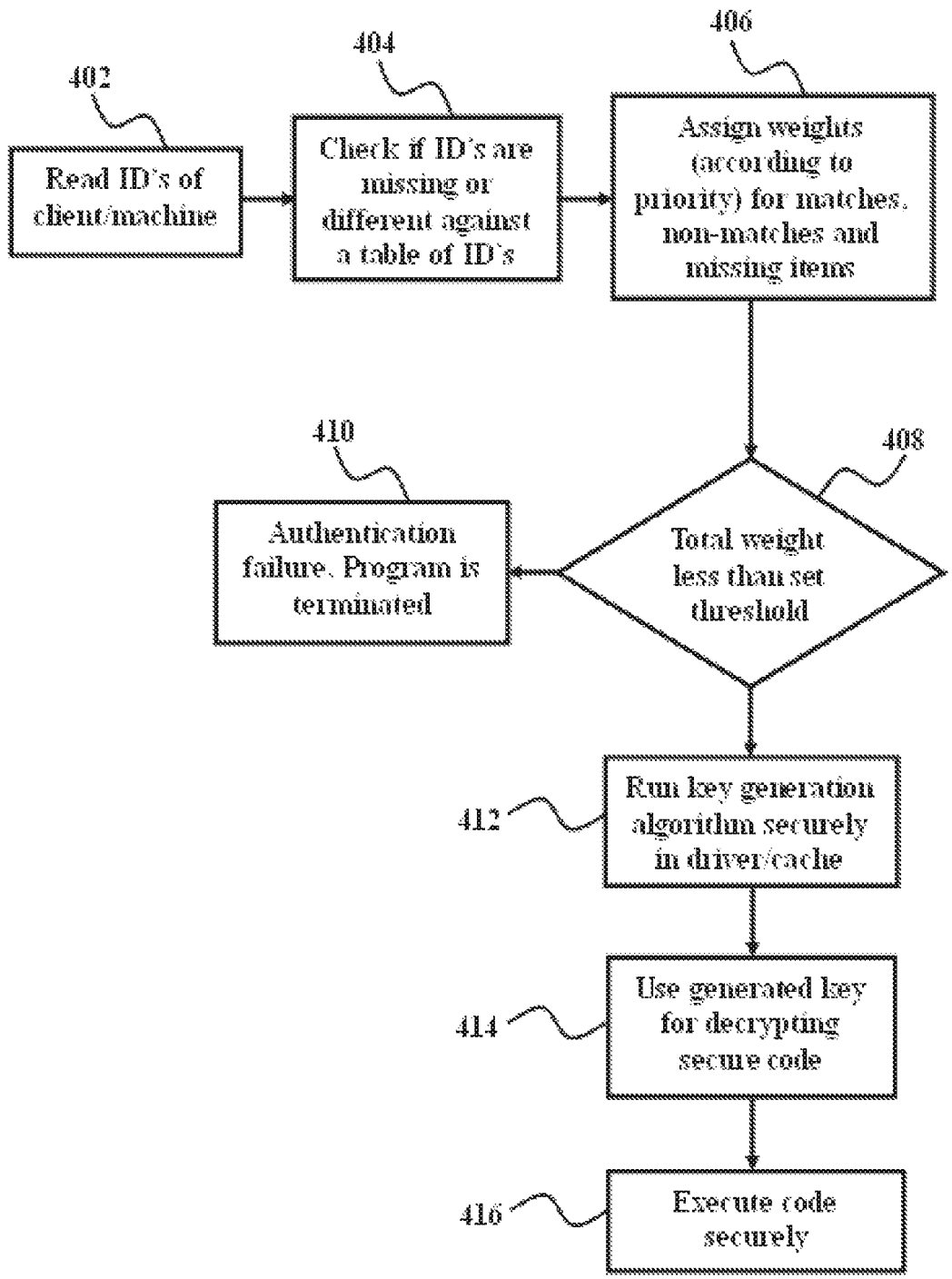
FIG. 4 illustrates a flow chart explaining the processes executed in the client machine in the secure software distribution and execution method according to one embodiment of the present invention.

FIG. 4 illustrates a flow chart explaining the processes executed in the client machine in the secure software distribution and execution method according to one embodiment of the present invention. With respect to FIG. 4, the ID of client is read and compared with a table of ID, when API calls are received by the driver of the client machine (402). The received ID is compared with the table of ID to detect whether the received ID is absent or not in the table of ID (404). When the received ID is absent, then a weighting factor is assigned to each of the identification data based on the priority of the received of the read ID data, matched ID data and missing items (406). The sum of the weighting factors assigned to each ID data is calculated and compared with a threshold level to authenticate the client (408). The driver authenticates the client for decoding the encrypted portion of the file, when the sum of the weighting factors assigned to the identity data is less than the threshold level. The client is not authenticated and the key generation algorithm is destroyed, when the sum of the weighting factors assigned to the identity data is less than the threshold level (410).

The key generation algorithm is designed uniquely for each client. The key generation algorithm is run in privileged mode in cache memory to generate a key (412). The generated key is used for decrypting the secure code (414). The code is executed securely after decrypting the secure code (416). The decrypted code is destroyed after each use. The decryption algorithms used for decrypting the different encrypted files in the same application in the same client are different. The unique decryption algorithm is designed for each client, when the client machine initiates a software download of an application or registers software that is available on a media.

Thus the various embodiments of the present invention provide a secure software distribution system and method to generate unique and individual algorithm for each client to provide a very strong security solution for protecting application and data integrity. The system provides a proven security on a platform to software vendors and generates platform specific algorithms to avoid the class break scenario that is prevalent on systems/implementations. The present invention creates unique platform ID and executes proprietary reconfigurable algorithm for authentication and fraud detection.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

It is also to be understood that the following claims are intended to cover all of the generic and specific features of the present invention described herein and all the statements of the scope of the invention which as a matter of language might be said to fall there between.

What is claimed is:

1. A secure software distribution and execution method comprising:
   receiving a software application from a service provider for storing in a server for downloading to a client;
   coding the received software application in the server;
   identifying sections of code for encryption by the server;
   inserting Application Programming Interface (API) calls in the received software application at identified sections of the code for encryption before being downloaded to the client by the server, the API calls a driver in the client once the software application is downloaded to the client;
   building an application and placing one or more binaries in the server;
   reading an identity data of the client by the server;
   generating an algorithm for encryption, a decryption algorithm and a decryption key based on received identity data of the client in the server;
   encrypting the identified sections of the received software application using the generated encryption algorithm in the server; and
   downloading the encrypted sections of the received software application along with the generated decryption key and the decryption algorithm to a driver of the client.

2. The method according to claim 1, wherein the API sends the encrypted section to the driver of the client so that the driver of the client decrypts the encrypted section using the decryption key and the decryption algorithm to enable the continuous execution of the downloaded software.

3. The method according to claim 1, wherein the encryption algorithm, decryption key and decryption algorithm are unique and are different for different clients.

4. The method according to claim 1, wherein the identity data includes the serial number of the client machine, serial number of the hard disc used in the client machine, biometric data and other identity related information provided by the client.

5. The method according to claim 4, wherein the server assigns weighting factors to each of the identity data read from the client so that the client is authenticated to decode the encrypted section, even when the identification component is changed in the client.

6. The method according to claim 5, wherein the server authenticates the client for decoding the encrypted portion of the software application by comparing a sum of the weighting factors assigned to the identity data with a threshold level.

7. The method according to claim 6, wherein the server authenticates the client for decoding the encrypted section of the received software application, when the sum of the weighting factors assigned to the identity data is less than the threshold level.

8. The method according to claim 1 further comprising uniquely designing a key generation algorithm for each client.

9. The method according to claim 8, wherein the key generation algorithm and the decryption algorithm are run in privileged mode in cache memory.

10. The method according to claim 1 further comprising decrypting the encrypted sections using the generated decryption key and the decryption algorithm and destroying the decrypted sections after each use.

11. The method according to claim 1, wherein the decryption algorithm used for decrypting the different encrypted sections in the same application in the same client is different.

12. The method according to claim 1, wherein a unique decryption algorithm is designed for each client, when the client initiates a software download of an application or registers a software that is available on a media.

13. A secure software distribution and execution system, comprising:
a server into which a received software application from a service provider is stored;
a client machine connectible to the server;
the server having an application generator interface that codes the received software application, identifies sections of code for encryption, inserts Application Programming Interface (API) calls in the received software application at appropriate places before being downloaded to the client by the server, builds an application and placing one or more binaries in the server;
the server having an ID reader that reads an identity data of the client;
the server having an algorithm generator that generates an algorithm for encryption, decryption key and decryption based on received identity data of the client in the server;
the server having an encryptor that encrypts the identified sections of the received software application using the generated encryption algorithm in the server; and
the server having an application downloader that downloads the encrypted sections of the received software application along with the generated decryption key and the decryption algorithm to a driver of the client.

* * * * *

UNITED STATES PATENT AND TRADEMARK OFFICE
CERTIFICATE OF CORRECTION

PATENT NO. : 8,533,859 B2
APPLICATION NO. : 12/422569
DATED : September 10, 2013
INVENTOR(S) : Bhaktha Ram Keshavachar and Navin Govind It is certified that error appears in the above-identified patent and that said Letters Patent is hereby corrected as shown below:

Title page, item [73] Assignee, "Carlsbad, AZ (US)" should read -- Carlsbad, CA (US) --

Signed and Sealed this
Nineteenth Day of November, 2013

Teresa Stanek Rea
*Deputy Director of the United States Patent and Trademark Office*